United States Patent [19]
Wentland et al.

[11] Patent Number: 6,003,813
[45] Date of Patent: Dec. 21, 1999

[54] ESCAPE SYSTEMS FOR AIRCRAFT OVERHEAD REST AREAS

[75] Inventors: Mark E. Wentland, Lynnwood; Gregory J. Oakes, Duvall, both of Wash.

[73] Assignee: The Boeing Company, Seattle, Wash.

[21] Appl. No.: 09/144,406

[22] Filed: Aug. 31, 1998

Related U.S. Application Data

[60] Provisional application No. 60/058,343, Sep. 10, 1997.

[51] Int. Cl.$^6$ .............................. B64D 11/00; B64D 1/22
[52] U.S. Cl. ...................................... 244/118.5; 244/137.2
[58] Field of Search ............................. 244/137.2, 118.5, 244/118.6, 129.5, 118.3, 140, 141, 139, 137.1; 182/48, 49, 97, 106; 105/315, 321, 327, 340, 280; 193/25 B, 25 C

[56] References Cited

U.S. PATENT DOCUMENTS

| | | | |
|---|---|---|---|
| 2,081,529 | 5/1937 | Canney | 244/118.6 |
| 2,092,655 | 9/1937 | Page, Jr. | 244/118.6 |
| 2,124,003 | 7/1938 | McDonnell, Jr. et al. | 244/118.6 |
| 2,196,546 | 4/1940 | Bowers | 244/129.5 |
| 2,208,683 | 7/1940 | Page, Jr. | 244/118.6 |
| 2,280,065 | 4/1942 | De Roode | 244/118.6 |

(List continued on next page.)

FOREIGN PATENT DOCUMENTS

| | | | |
|---|---|---|---|
| 0 035 955 | 2/1981 | European Pat. Off. . | |
| 34357 | 8/1981 | European Pat. Off. | 244/137.2 |
| 39466 | 11/1981 | European Pat. Off. | 244/137.2 |
| 1002271 | 3/1952 | France . | |
| 384752 | 6/1922 | Germany | 244/118.5 |
| 1064348 | 8/1959 | Germany | 244/137.2 |
| 555185 | 6/1958 | Italy | 244/137.2 |
| 301492 | 12/1989 | Japan | 244/137.2 |
| 220634 | 5/1968 | Sweden | 244/137.2 |
| 205575 | 11/1967 | U.S.S.R. | 244/137.2 |
| 1740254 | 6/1992 | U.S.S.R. | 244/137.2 |
| 718658 | 11/1954 | United Kingdom | 244/137.2 |
| 1538084 | 1/1979 | United Kingdom | 244/137.2 |
| 2169256 | 7/1986 | United Kingdom | 244/118.5 |
| 2203712 | 10/1988 | United Kingdom | 244/137.2 |

OTHER PUBLICATIONS

Flight Structures Inc., "747 Door 4 Overhead Crew Rest," publication date unknown.
The Boeing Company, "747–400 Overhead Crew Rest, Door 5," publication date unknown.
McDonnell Douglas, "Skybunk," publication date unknown.
*Air Transport World*, Nov. 1995 p. 39.
Schulz et al., "Lower Deck Module for Flexible Alternative Use of the Lower Deck of a Jumbo Jet," publication date unknown.
Bruce Smith, "Douglas Plans Shorter, Double–Deck MD–12," *Aviation Week*, Apr. 1992.
*Aviation Week*, "Airbus Studies Stretched Version of A330 With Dual Deck Configuration," Mar. 1990.
*Aviation Week*, "Airbus, MBB Define Cargo Hold Rest Area," p. 41, Oct. 1987.
*Aircraft Engineering*, "A340 Cabin Offers New Levels of Comfort for Passengers and Crew," Dec. 1991.
Aviation Week and Space Technology pp. 38 and 39, Feb. 1966.
Janes Aircraft, Vickers p. 60b, Jan. 1922.

*Primary Examiner*—Michael J. Carone
*Assistant Examiner*—Fredrick T. French, III
*Attorney, Agent, or Firm*—Christensen O'Connor Johnson & Kindness PLLC

[57] ABSTRACT

An overhead rest area is provided in the crown of an aircraft above the ceiling for the main passenger cabin. A permanent access stairway is provided at one end of the overhead rest area, and an emergency escape apparatus is provided at another location of the rest area. The emergency escape apparatus can include a slide swingable between a closed position in which its underside forms a smooth continuation of the ceiling of the passenger cabin and a downward swung open position providing an escape route from the overhead rest area to the passenger cabin.

12 Claims, 24 Drawing Sheets

U.S. PATENT DOCUMENTS

| | | | |
|---|---|---|---|
| 2,310,573 | 2/1943 | Burton | 244/118.6 |
| 2,382,402 | 8/1945 | Roode | 244/118.6 |
| 2,389,160 | 11/1945 | Manson et al. | 244/137.2 |
| 2,506,380 | 5/1950 | Myers | 182/78 |
| 2,531,263 | 11/1950 | Fink et al. | 182/97 |
| 2,813,494 | 11/1957 | Haman et al. | 105/340 |
| 2,901,055 | 8/1959 | Fairchilds et al. | 182/49 |
| 2,946,294 | 7/1960 | Murphy | 182/3 |
| 2,946,396 | 7/1960 | McDougal | 105/315 |
| 2,953,103 | 9/1960 | Bohannon et al. | 105/315 |
| 3,144,224 | 8/1964 | Carroll | 244/129.5 |
| 3,176,334 | 4/1965 | Lovdahl | 14/71.1 |
| 3,339,690 | 9/1967 | Craig | 193/6 |
| 3,738,450 | 6/1973 | Hessler et al. | 182/48 |
| 3,883,910 | 5/1975 | Naylor, III | 114/355 |
| 3,898,704 | 8/1975 | Gallaher et al. | 5/2.1 |
| 3,982,608 | 9/1976 | Booth | 182/49 |
| 4,022,404 | 5/1977 | Greiss | 244/118.5 |
| 4,055,317 | 10/1977 | Greiss | 244/118.5 |
| 4,066,227 | 1/1978 | Buchsel | 244/118.6 |
| 4,071,210 | 1/1978 | Mutke | 244/118.6 |
| 4,109,759 | 8/1978 | Cundiff, Jr. | 182/19 |
| 4,109,760 | 8/1978 | Marra | 182/48 |
| 4,176,812 | 12/1979 | Baker | 244/129.5 |
| 4,397,432 | 8/1983 | Resetar | 244/118.6 |
| 4,458,864 | 7/1984 | Colombo et al. | 244/118.6 |
| 4,589,612 | 5/1986 | Halim | 244/118.6 |
| 4,594,817 | 6/1986 | McLaren et al. | 52/34 |
| 4,686,908 | 8/1987 | Legrand | 105/315 |
| 4,726,550 | 2/1988 | Chen et al. | 244/137.2 |
| 4,745,643 | 5/1988 | Clarke | 5/9.1 |
| 4,925,132 | 5/1990 | Zider | 244/118.1 |
| 5,106,036 | 4/1992 | Sepstrup | 244/129.1 |
| 5,112,159 | 5/1992 | Verret | 405/195.1 |
| 5,115,999 | 5/1992 | Buchsel et al. | 244/118.5 |
| 5,129,597 | 7/1992 | Manthey et al. | 244/118.5 |
| 5,205,515 | 4/1993 | Luria | 244/118.5 |
| 5,314,143 | 5/1994 | Luria | 244/118.1 |
| 5,383,629 | 1/1995 | Morgan | 244/118.6 |
| 5,395,075 | 3/1995 | Sprenger et al. | 244/118.5 |
| 5,400,985 | 3/1995 | Banks | 244/137.2 |
| 5,413,292 | 5/1995 | Luria | 244/118.1 |
| 5,425,516 | 6/1995 | Daines | 244/118.6 |
| 5,441,218 | 8/1995 | Mueller et al. | 244/118.1 |
| 5,474,260 | 12/1995 | Schwertfeger et al. | 244/118.5 |
| 5,526,999 | 6/1996 | Meston | 244/2 |
| 5,687,929 | 11/1997 | Hart et al. | 244/118.1 |
| 5,784,836 | 7/1998 | Ehrick | 52/79.8 |
| 5,871,066 | 2/1999 | Reece | 182/48 |

ESCAPE SYSTEMS FOR AIRCRAFT OVERHEAD REST AREAS

This application claims the benefit of U.S. Provisional Application No. 60/058,343, filed Sep. 10, 1997.

FIELD OF THE INVENTION

The present invention relates to sleeping compartments or other rest areas for commercial passenger aircraft, particularly overhead rest areas for use by flight attendants and pilots during long non-stop flights, and emergency escape systems for such rest areas.

BACKGROUND OF THE INVENTION

Modern commercial aircraft are designed for maximizing the dollar value of the payload, which can involve maximizing the passenger carrying capacity, taking into consideration passenger amenities which may command a premium fare.

For many passenger aircraft of circular or ovoid cross-section, the main cabin floor is disposed somewhat below the geometric center to provide a large passenger compartment having the usual ceiling, overhead storage compartments, and other amenities. Ducts, cables, safety equipment, etc., can run through the small "crown" at the top above the ceiling and overhead bins. The space below the cabin floor, substantially smaller than the cabin area itself, is designed for standardized cargo/baggage containers, as well as equipment bays, structural members, and auxiliary equipment. The area above the passenger cabin ceiling is even smaller. All in all, the goal is to provide a single, large, attractive passenger cabin with few encumbrances not directly associated with passenger comfort, such as galleys and lavatories.

Long range subsonic airliners may have non-stop flights of a duration of 12 hours or more. On such long flights, it is required by federal regulations to provide room for pilot rest areas and necessary to also provide attendant rest areas. For example, in the case of a Boeing 747, a small aft portion may be reserved for an upstairs bunkhouse, in an area aft of passenger seating, and it has been proposed to provide bunks in other non-seating areas, over or adjacent to other cabin monuments such as galley areas and/or areas adjacent to rear exit doors.

SUMMARY OF THE INVENTION

The present invention provides emergency escape apparatus for a rest area in the crown of an aircraft, such as a long range subsonic passenger airliner, above the ceiling of the passenger cabin. The rest area can be provided in a wide body, dual aisle aircraft having starboard, center, and port seat groups. In one embodiment, the rest area is centered over the center seat group, without dividing the passenger cabin longitudinally, but rather still providing adequate headroom above the center seat group. Primary access to the overhead rest area can be by way of a stairway in the aft portion of the aircraft, behind the last row of seating of the center seat group, adjacent to an aft galley. The stairway leads to a long, narrow aisle which permits transiting the enclosed space between longitudinally extending beds at either side. To the extent that it is required to achieve adequate headroom in the aisle, the overhead bin structure above the center seat group of the main passenger cabin is lowered relative to a conventional design. Should sufficient headroom exist for the insertion of a long narrow aisleway between bunks, the internal space captive within the overhead bin envelope is utilized. In these instances overhead bins still are available on opposite sides of the lower portion of the aisle. Emergency equipment and passenger amenities, such as ventilation outlets, reading lights, call buttons, etc. are still provided to the passenger area directly below the overhead rest area.

The stairway may open at the side or to the rear, and one or more beds may be deleted to provide a widened aisle or passing area to ease ingress and egress when multiple users are in the rest area. In one configuration, three side-by-side beds can be provided at the forward end of the overhead rest area.

The rest area may incorporate a lounge consisting of a settee, a couch, recliners, and one or more storage areas. The lounge, as well as the bunk or bed units, can be provided as modules, and the lounge can be located at any desired location along the length of the overhead rest area.

In another configuration, a center bed can be provided at the forward end of the overhead rest area, staggered relative to beds at opposite sides. The forward portion of the center bed can lead to equipment storage bins, such as for electronic equipment or power supplies associated with video displays or other passenger amenities for the main cabin.

While a central aisle is currently preferred, the aisle of the overhead rest area can be offset relative to the centerline of the aircraft, in which case beds may be arranged along only one side of the aisle, and the overhead storage bins removed from the side having the aisle, while larger bins are provided at the other side. Another alternative is to provide transversely extending beds in conjunction with an offset aisle, or beds extending longitudinally along one side of the aisle and transversely along the other side of the aisle.

Regardless of the configuration, ducts and structural members normally located in the central portion of the crown of the aircraft are relocated outboard and, preferably, the rest area directly overlies passenger seating without a substantial effect on the number of seats in the main cabin and, therefore, without affecting the revenue generating capability of the seating configuration.

In accordance with the present invention, emergency escape apparatus is provided for overhead rest areas of the type described above. While it may be possible to provide an additional stairway at the opposite end of the rest area from the primary access stairway, this will necessarily occupy valuable space in the main passenger cabin. Thus, in accordance with the present invention, emergency escape systems are provided which do not require a separate stairway. In one embodiment, one overhead bin in the main cabin is replaced with a slide that swings between a retracted position matching the profile of the ceiling and an extended position allowing users of the overhead rest area to exit into an aisle of the main cabin. Access to the slide can be through a false bottom of one of the beds of the overhead rest area. The length of the slide may be selected based on the type of center seat group that the slide overlies, or a slide of adjustable length can be provided to adapt the escape system to center seat groups of different widths. In another embodiment, a separate escape module is provided for the overhead rest area, whereby after removing a ceiling panel leading from the overhead rest area to the main passenger cabin, a user may lie down and slide outward and downward into an aisle of the main cabin area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
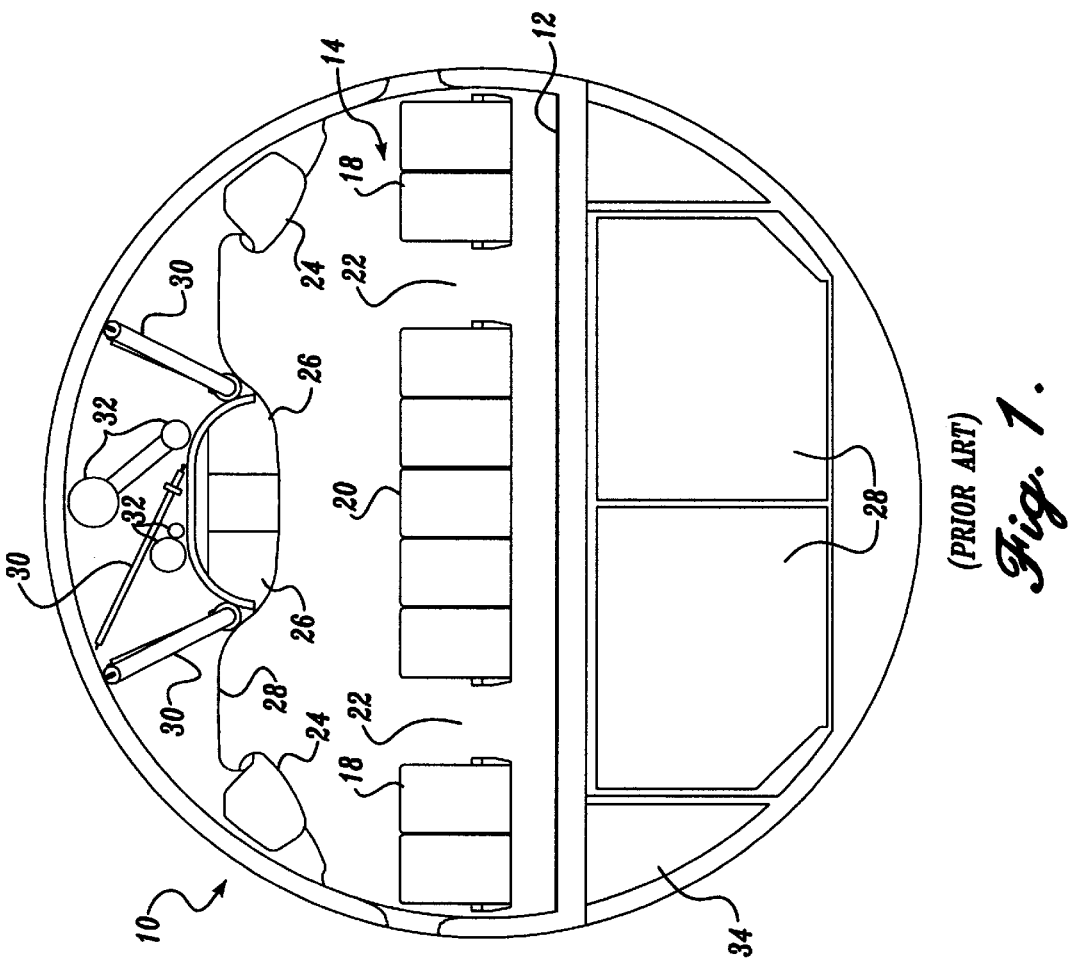
FIG. 1 (prior art) is a diagrammatic cross-section of an aircraft of the type with which the present invention is intended to be used, such as a Boeing 777.

FIG. 1 shows a diagrammatic cross-section of an aircraft of the type with which an overhead attendant rest area can be used, in this case a Boeing 777. For most of its length, the aircraft 10 is of circular cross-section, a semimonocoque design having an outer skin supported on an inner peripheral frame. The floor 12 of the main cabin is disposed somewhat below the geometric center to provide a large passenger compartment 14 having the usual seating. For a wide body aircraft, typically the seating will include two outboard seat groups 18 and a center seat group 20, with aisles 22 between the outboard groups and the center group. While a 2-5-2 configuration of seating is shown, other configurations are possible, such as a 3—3—3 configuration, with reference to the number of seats in each group. Most often, however, the most efficient layout for a wide body aircraft having dual aisles necessitates the provision of a center seat group 20 along the centerline of the aircraft.

The large passenger compartment 14 has outboard overhead storage compartments 24 (primarily for carry-ons), inboard overhead storage compartments 26, and other amenities. The ceiling 28, storage bins 24 and 26, and any other ceiling mounted amenities or equipment are supported by an arrangement of structural ties 30 which are mounted in the crown of the aircraft, i.e., the area above the ceiling 28 of the passenger compartment, along with air-conditioning ducts 32. Typically, the lower lobe 34 of the aircraft accommodates standard cargo/baggage containers 28, as well as equipment bays, structural members and auxiliary equipment.

Figure 2:
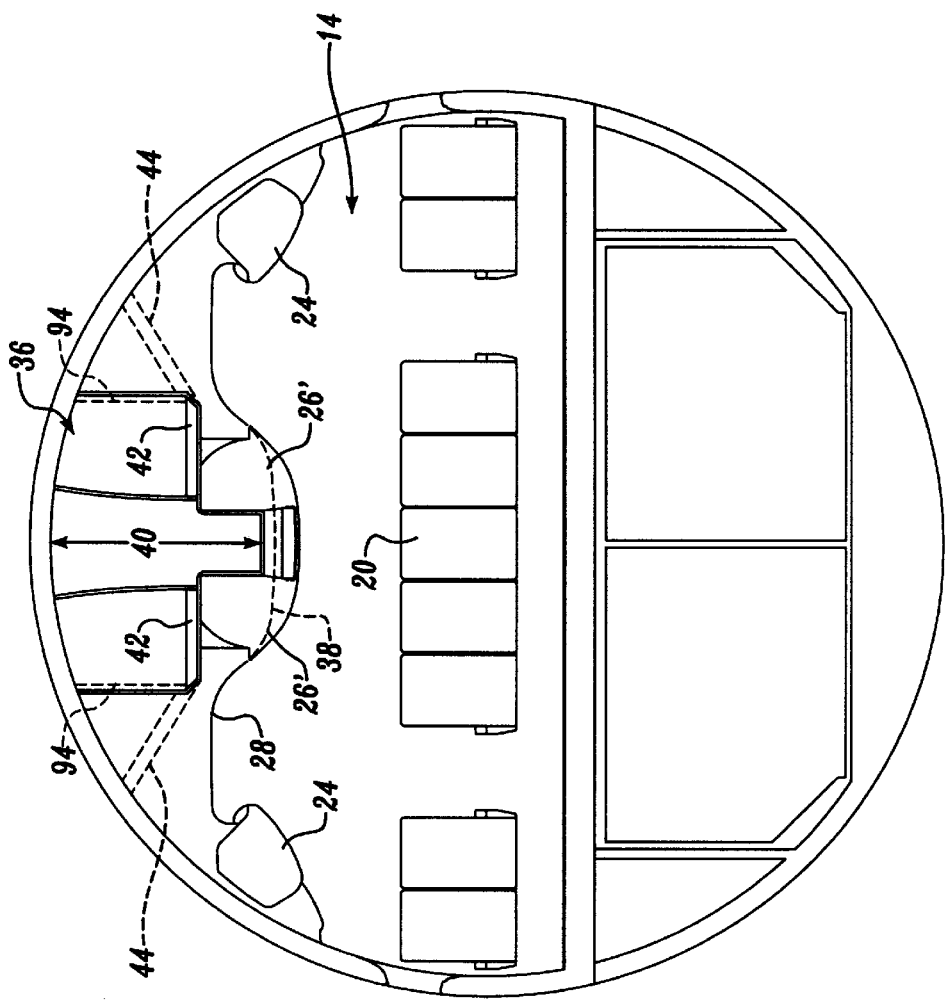
FIG. 2 is a diagrammatic cross-section corresponding to FIG. 1, illustrating the location of an overhead rest area of a type with which the present invention is concerned.

With reference to FIG. 2, an overhead rest area 36 is provided in the crown of the aircraft, above the ceiling 28 of the passenger cabin 14. The broken line 38 represents the contour of the central portion of the ceiling and overhead bin structure of the conventional aircraft shown in FIG. 1. The ceiling is lowered at the center, such that there is room for a narrow aisle 40 with increased headroom. The rest area preferably includes bunks or beds 42 at opposite sides of the aisle which extends along the centerline of the aircraft. While the design does not affect the location or sizing of the outboard overhead bins 24, modified inboard overhead bins 26' of reduced size are located at opposite sides, respectively, of the lower portion of the aisle 40. The tapering of the ceiling down toward the center still allows sufficient headroom for passengers occupying the center seat group 20, and for ingress thereto and egress therefrom. The air-conditioning ducts and structural members that normally would occupy the central portion of the room must be relocated outboard or be integrated between bunks such that bunk spaces have no interference. For example, the main structural support for the rest area can be by ties 44 angled outward from the rest area to the aircraft frame.

Figure 3:
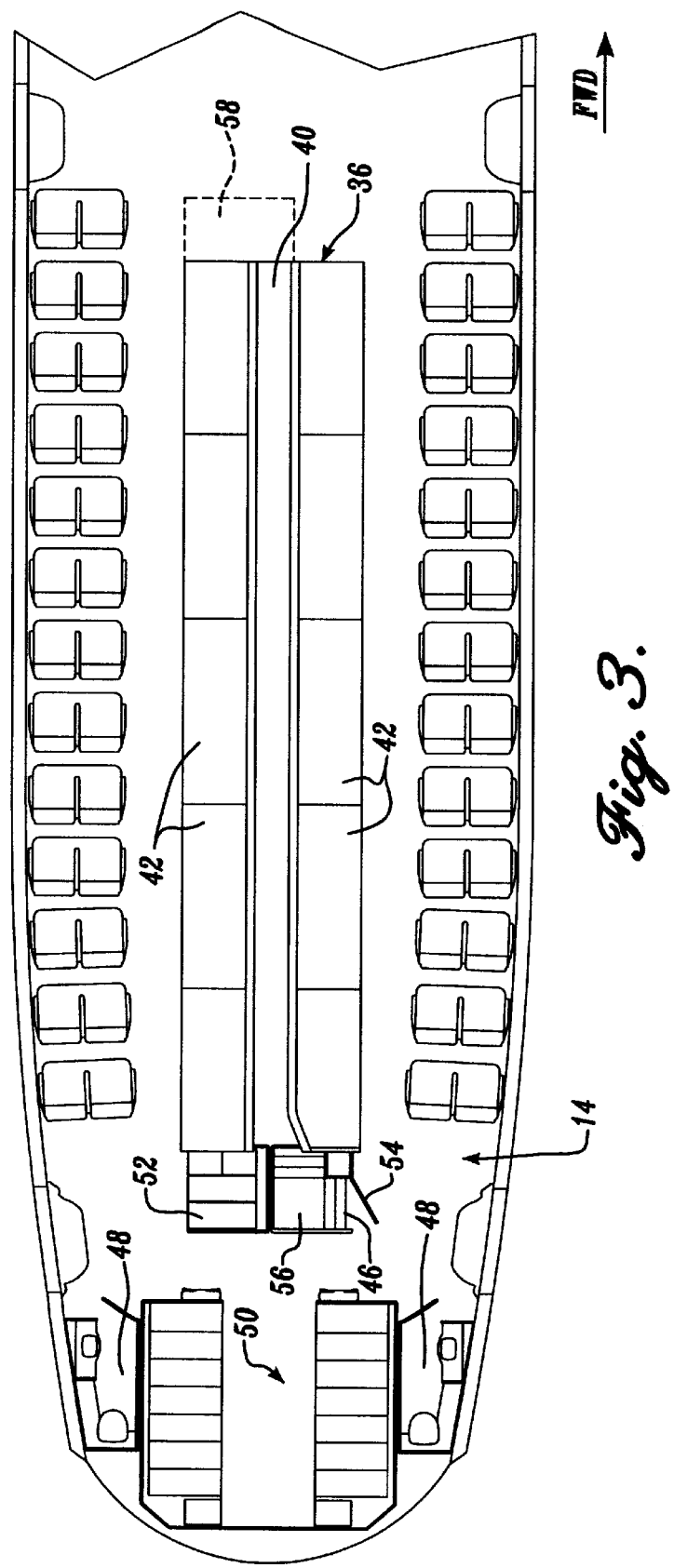
FIG. 3 is a diagrammatic top plan of the aft portion of the aircraft of FIG. 2, illustrating the layout of bunks or beds in the overhead rest area.
Figure 4:
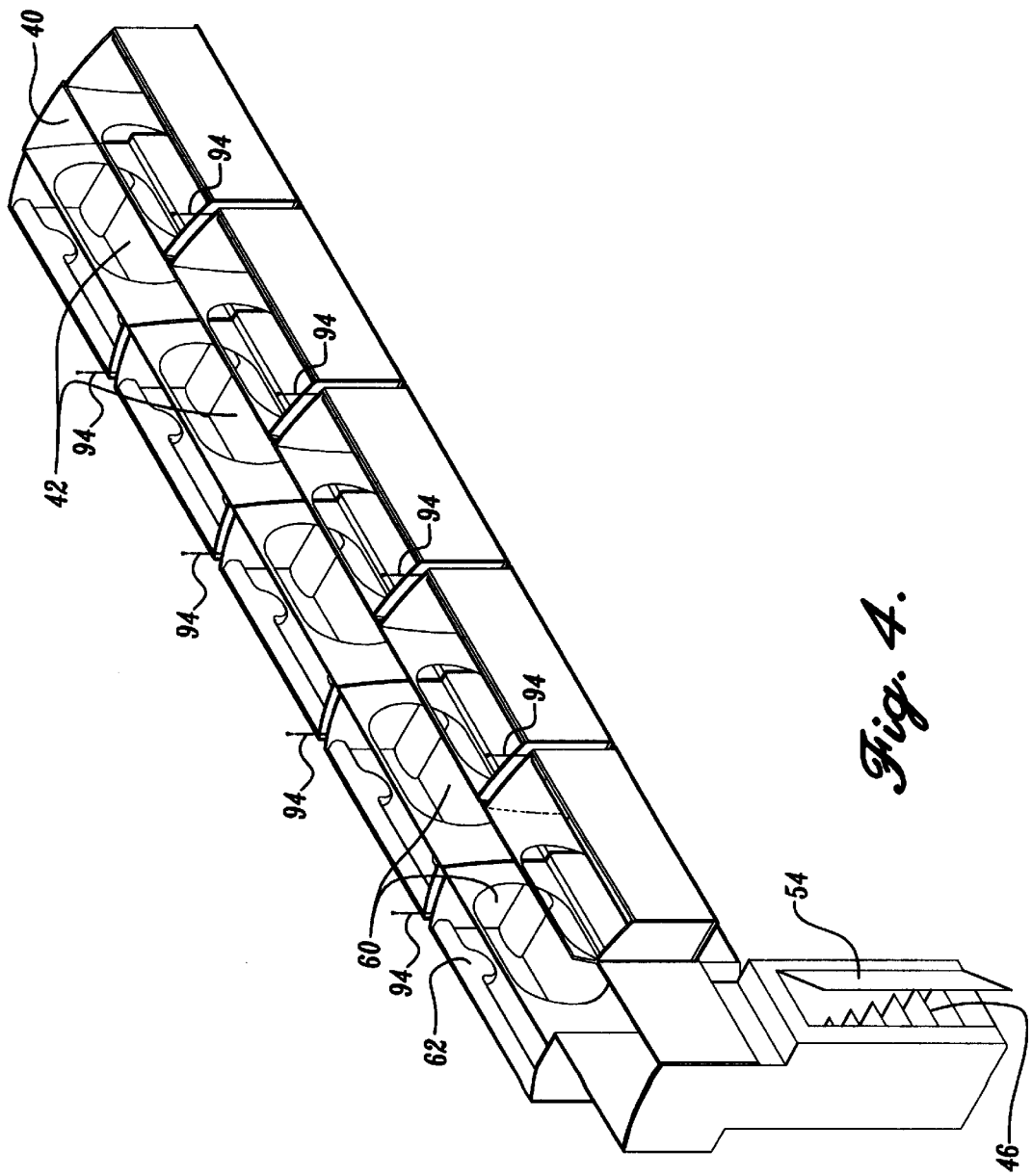
FIG. 4 is a diagrammatic top perspective of an overhead rest area in accordance with FIG. 3.

With reference to FIG. 3, access to the overhead rest area 36 can be by way of a stairway 46 in the aft portion of the aircraft, behind the last row of seating in the main passenger cabin 14, adjacent to the lavatories 48 and rear galley area 50, for example. The exact location of the stairway will depend on the location of permanent structure or monuments in the aircraft, such as the monument show as the existing equipment bay 52. Thus, if a monument is designed for the starboard side of the aircraft, the stairway will be located on the port side, rather than on the starboard side as shown. It is preferred that a secure door 54 be provided for the stairway so that unauthorized personnel do not have access. For safety purposes, the stairway can include a center landing 56 with lower stairs leading transversely to the landing, and an upper set of stairs leading from the landing to the aisle 40 between the beds 42. An additional stairway 58 can be provided at the forward portion of the overhead rest area, but this will occupy valuable space in the passenger cabin. With reference to FIG. 4, large side openings 60 provide convenient access to the beds 42, and privacy curtains can be provided for such openings. The layout lends itself to providing individual amenity modules 62 for the separate beds, which can include individually controlled lighting and ventilation nozzles, as well as communication equipment, and audio or visual alarms or call indicators. The layout provides regularly spaced intervals between individual bed modules for angled support members 44 (FIG. 2) and/or vertical support members 94 (FIG. 4) that coincide with regularly spaced intervals between sets of fuselage frames.

Figure 5:
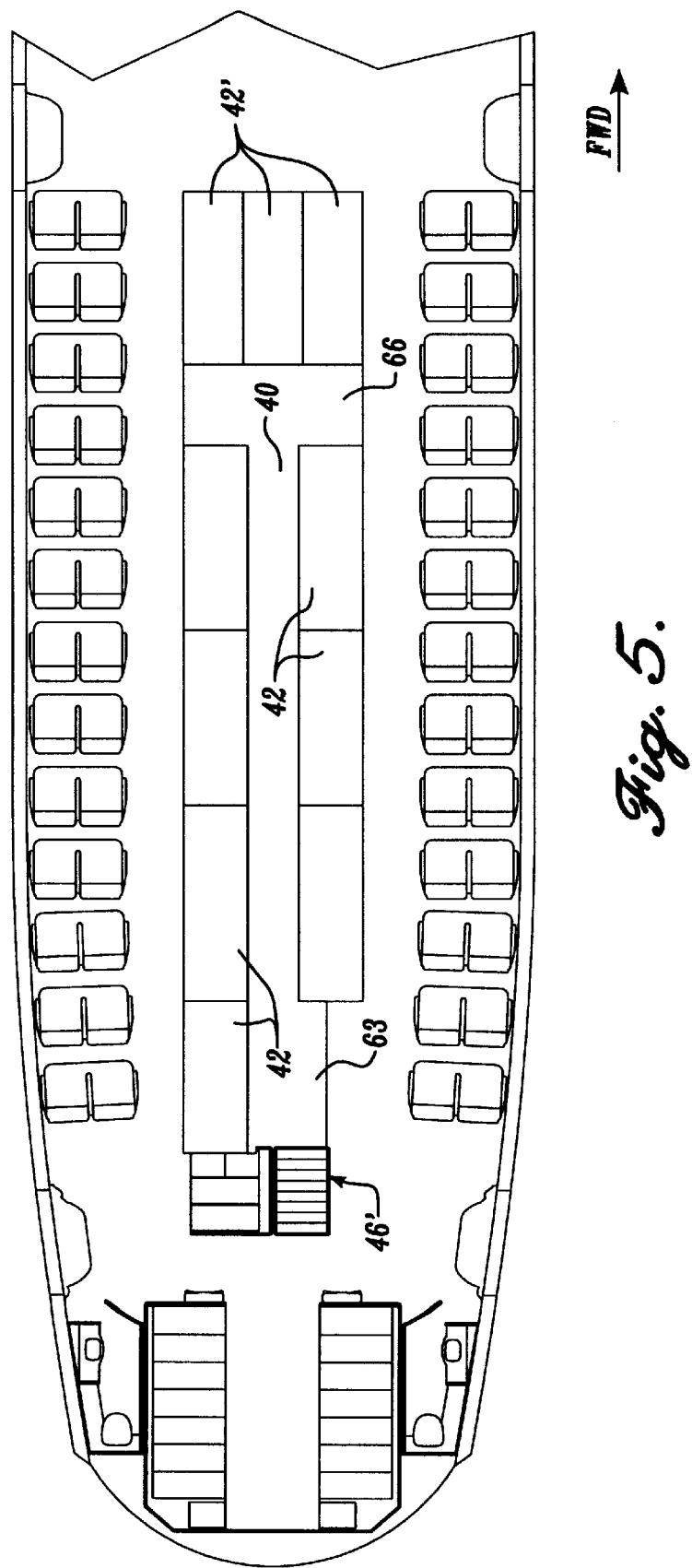
FIG. 5 is a diagrammatic top plan of the aft portion of an aircraft, corresponding to FIG. 3, but illustrating an alternative layout of beds in an overhead rest area.

In the alternative layout shown in FIG. 5, the aft stairway 46' extends solely longitudinally of the aircraft. The starboard aft bed is removed, providing a widened passing area 63 in the aft portion of the longitudinally extending aisle 40. This may necessitate removing or at least decreasing the size of the overhead bin(s) in this area. A cross aisle 66 is provided toward the front of the modified rest area, with three side-by-side beds 42' located forward of the cross aisle. These beds necessarily have only end access, which is not as convenient as the side access provided for the side beds 42.

Figure 6:
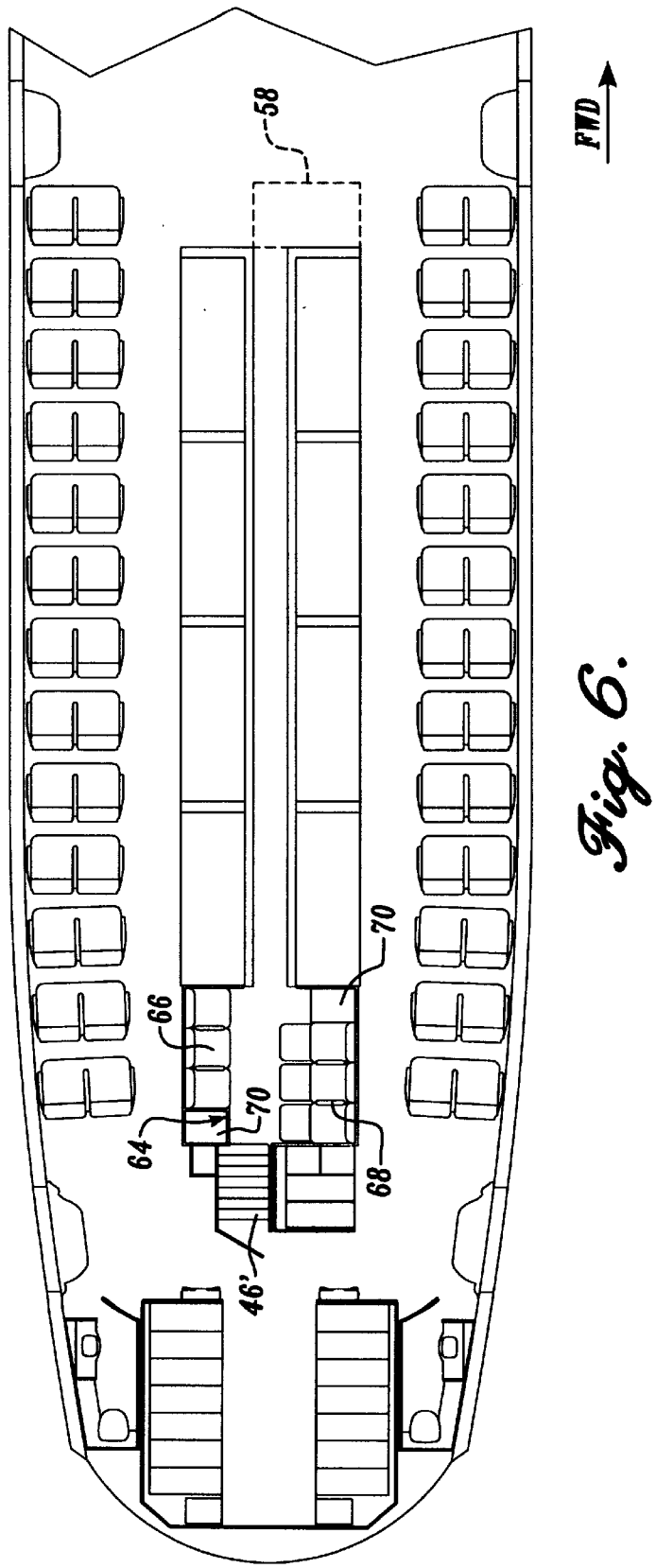
FIG. 6 is a diagrammatic top plan of an overhead rest area incorporating a lounge module.
Figure 7:
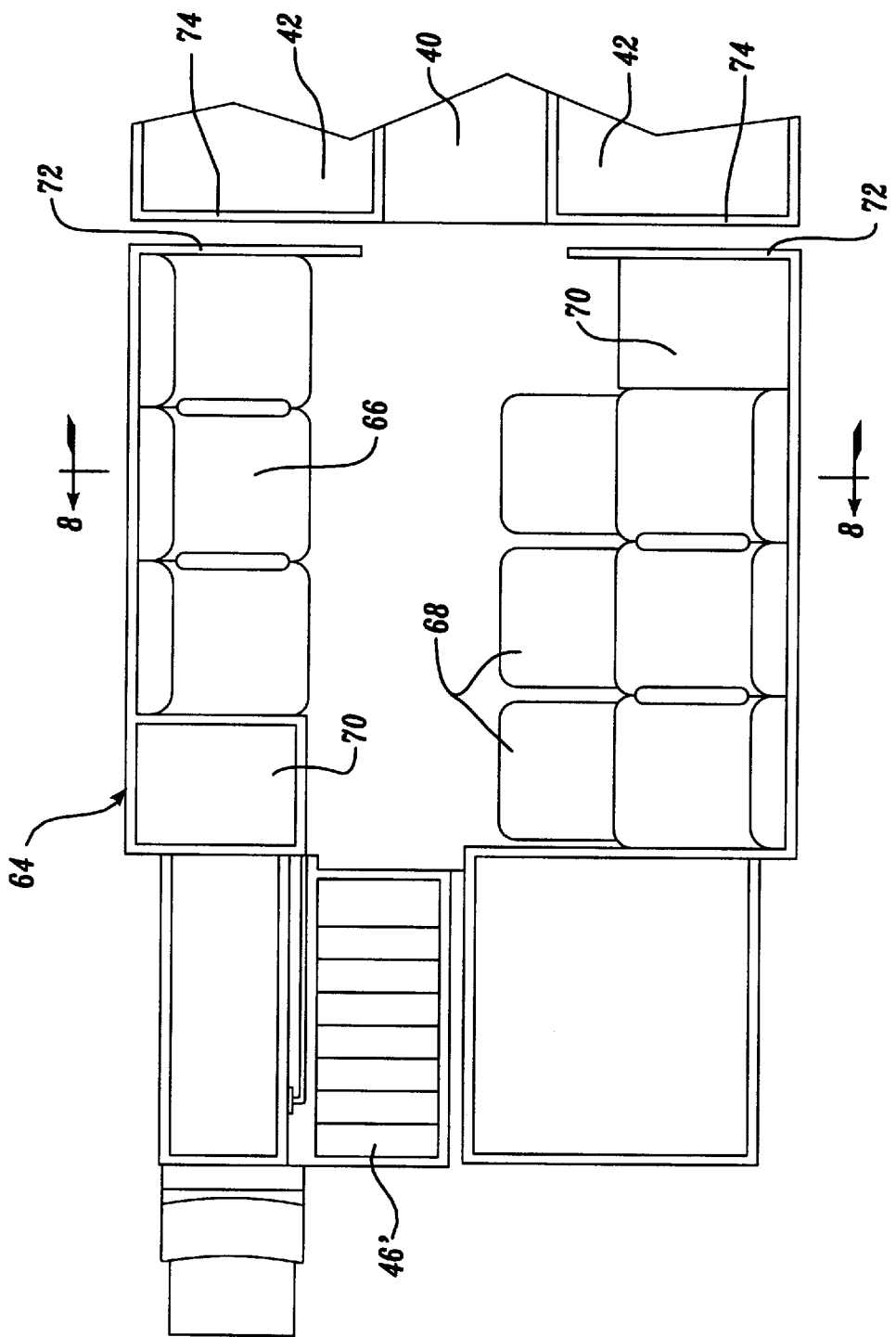
FIG. 7 is an enlarged diagrammatic top plan of the lounge module of FIG. 6.
Figure 8:
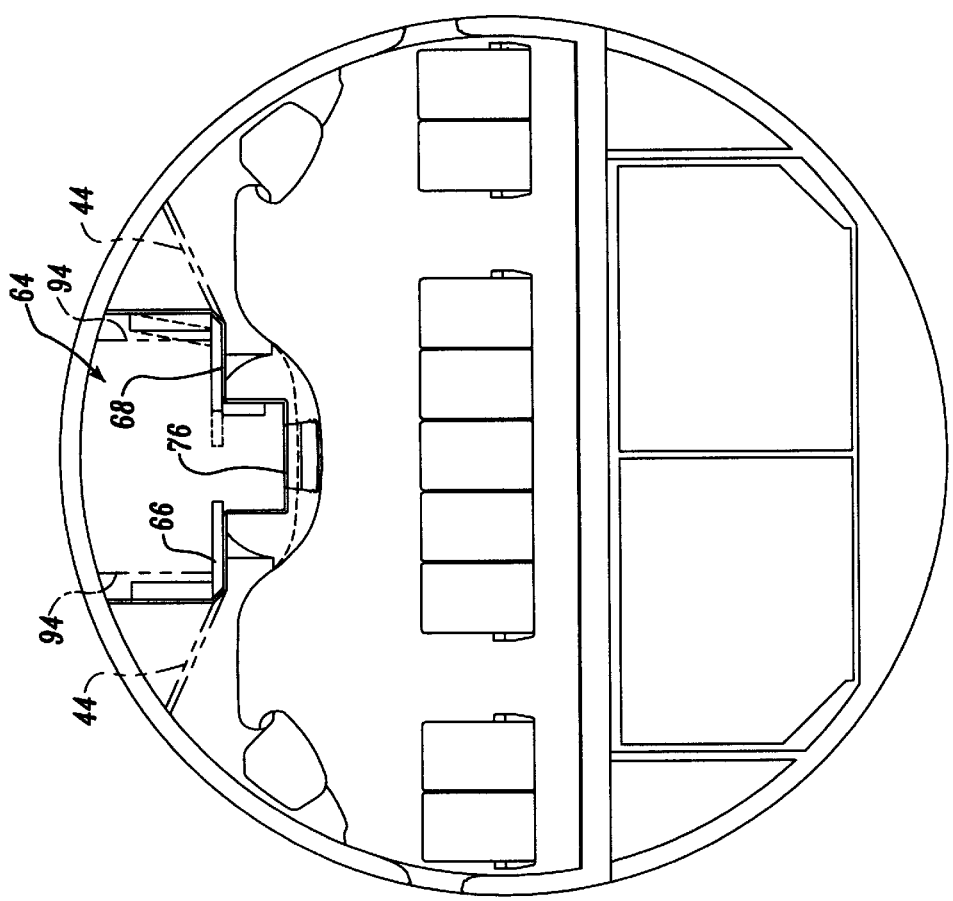
FIG. 8 is a diagrammatic section along line 8—8 of FIG. 7.
Figure 9:
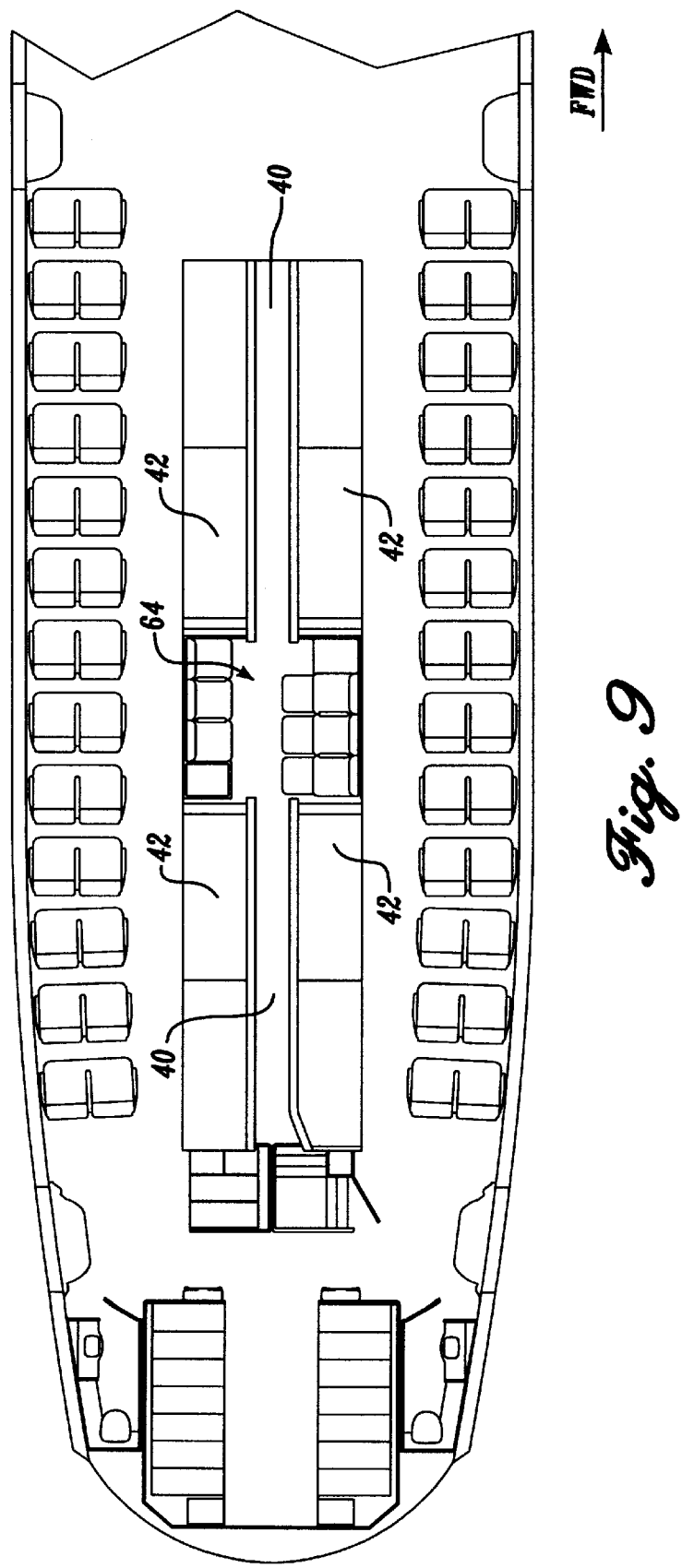
FIG. 9 is a diagrammatic top plan of the aft portion of an aircraft illustrating an alternative location for a lounge module.
Figure 10:
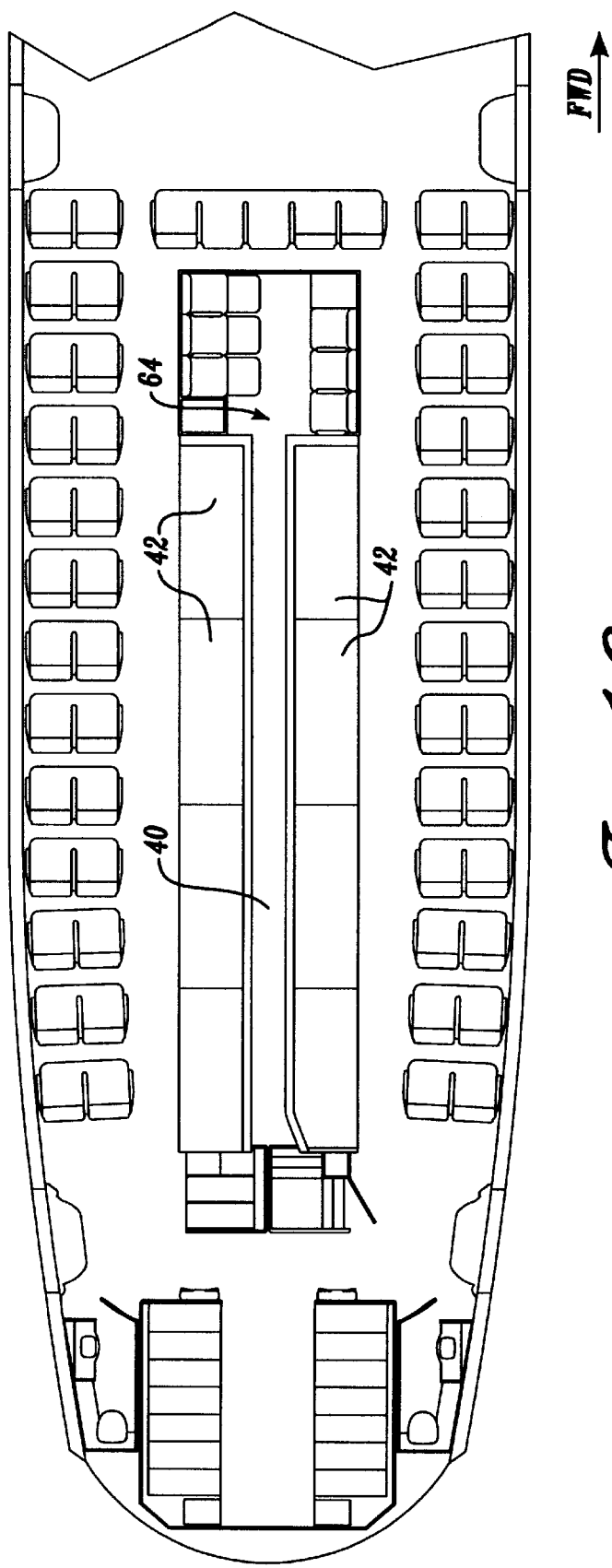
FIG. 10 is a diagrammatic top plan of the aft portion of an aircraft illustrating another alternative location for a lounge module.

The overhead rest area can be provided in modules so that additional sets or fewer sets of beds may be incorporated in a particular aircraft. For example, one module can consist of a section equal to the length of a bed. The end walls of the bed units can be secured together during installation. These modules systematically incorporate the necessary structure and system interfaces allowing additional or fewer sets of beds. The modular feature of the overhead rest area system in accordance with the present invention also lends itself to provision of other types of modules, such as a lounge module 64 as illustrated in FIGS. 6 and 7. FIG. 6 shows a stairway 46' mounted in the aft area of the aircraft at the port side, rather than to starboard, and the lounge module 64 is the first module reached by way of the stairway. A settee or couch 66 can be provided along one side of the module, with special comfort seating 68 at the other side, such as recliners. The increased floor area also allows users of the overhead rest area to pass by each other, and the lounge module can include closets or other storage units 70. The modular nature of the lounge module is best seen in FIG. 7, where the forward walls 72 are shown spaced rearward from the adjacent walls 74 of the next most forward module having a center aisle 40 and beds 42 at the sides. With reference to FIG. 8, the increased transverse dimension of the lounge floor 76 will necessitate changes in the configuration of the inboard overhead bins. The lounge area provides a comfortable location for resting and talking while sitting, without using revenue producing seats in the main cabin of the aircraft. The lounge area can be provided in the aft portion of the overhead resting area as shown in FIG. 6, or toward the center as shown in FIG. 9, or at the forward portion of the resting area as shown in FIG. 10. The center location of FIG. 9 probably provides the most convenient passing location.

Figure 11:
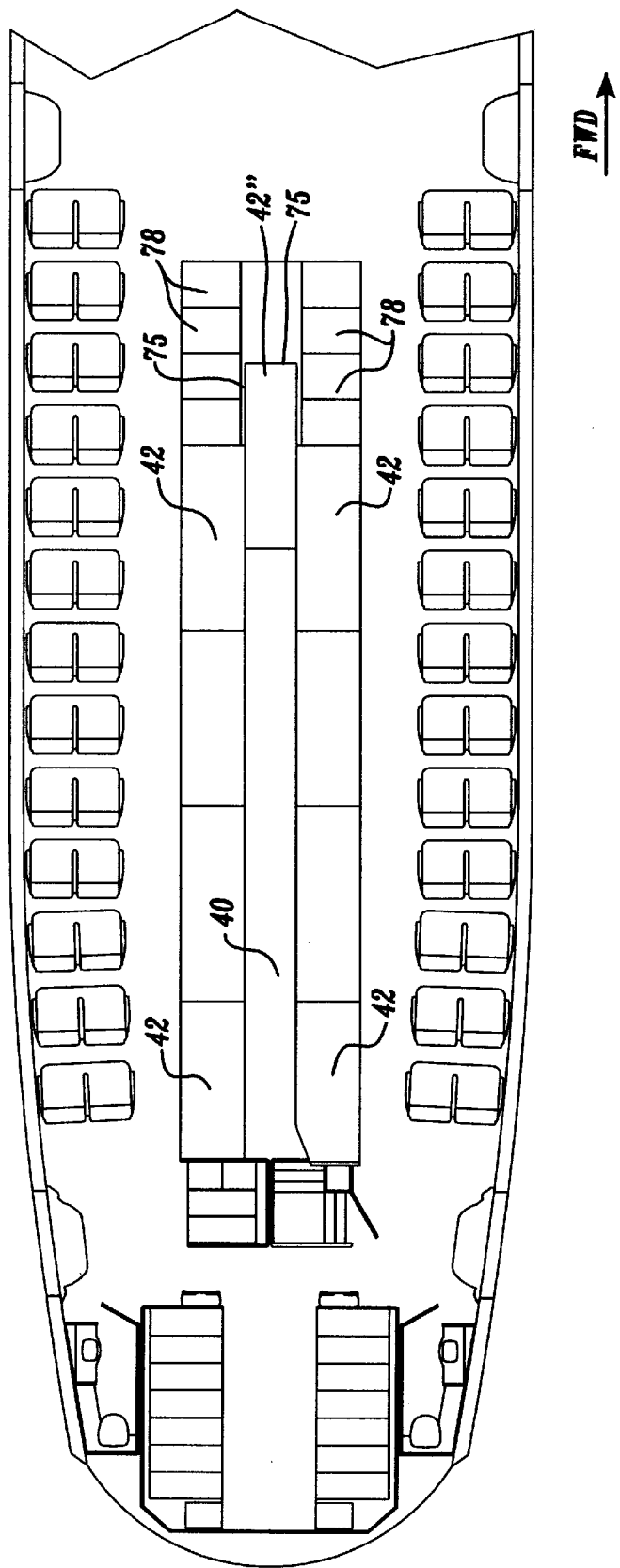
FIG. 11 is a diagrammatic top plan of the aft portion of an aircraft having an alternative layout for an overhead rest area.

In the configuration illustrated in FIG. 11, each of the three aft modules consist of beds 42 at opposite sides of the center aisle 40. The next most forward module also has beds 42 at the opposite sides, but another bed 42" is fitted between the forwardmost side beds 42, and shifted forward relative to those beds. Doors or removable walls 75 separate the center forward bed 42" from another modular area which can include storage bins 78 for power supplies, video projection units or other equipment, without occupying floor space in the main passenger cabin.

Figure 12:
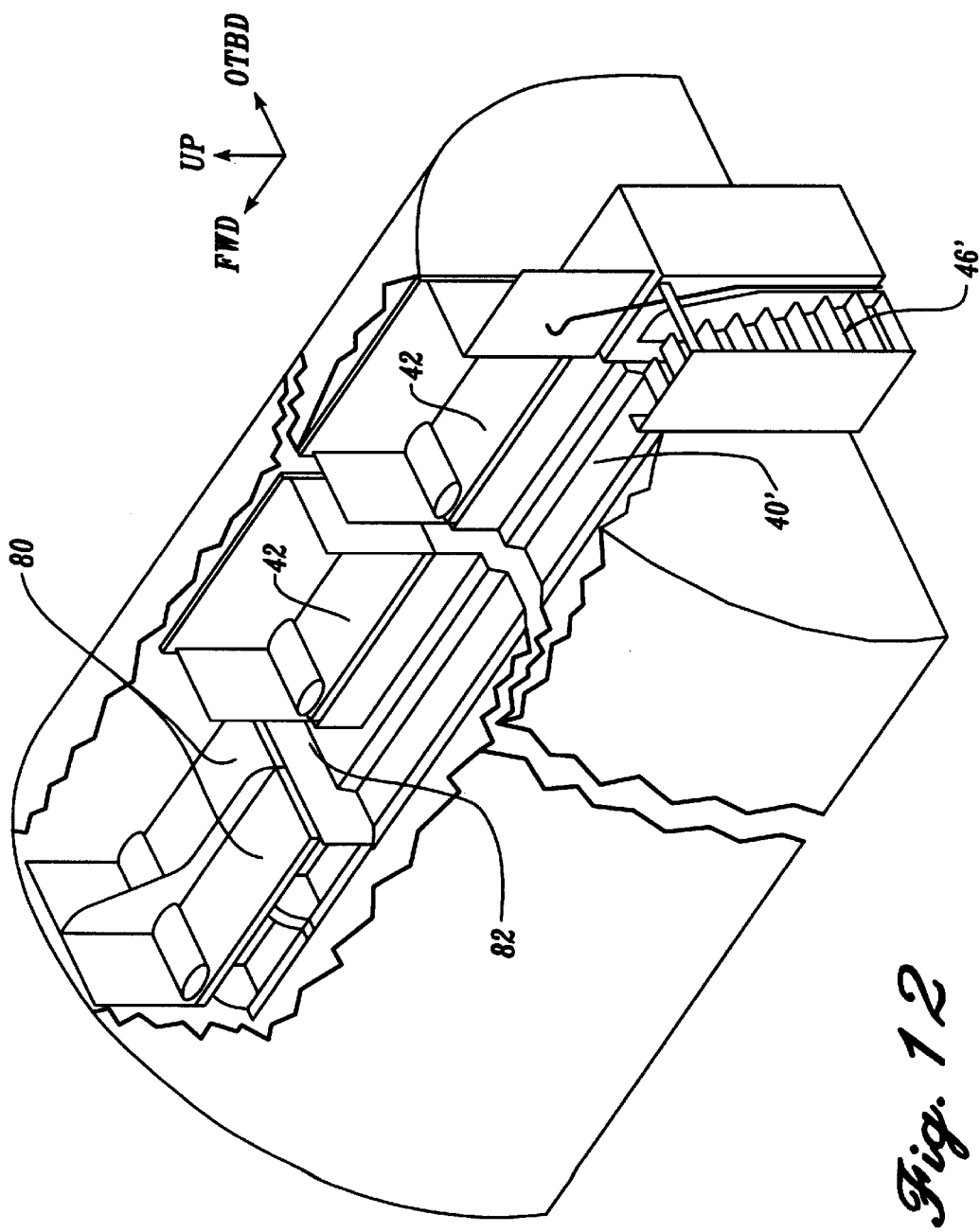
FIG. 12 is a diagrammatic top rear perspective of an alternative embodiment of an overhead rest area, having an offset aisle.
Figure 13:
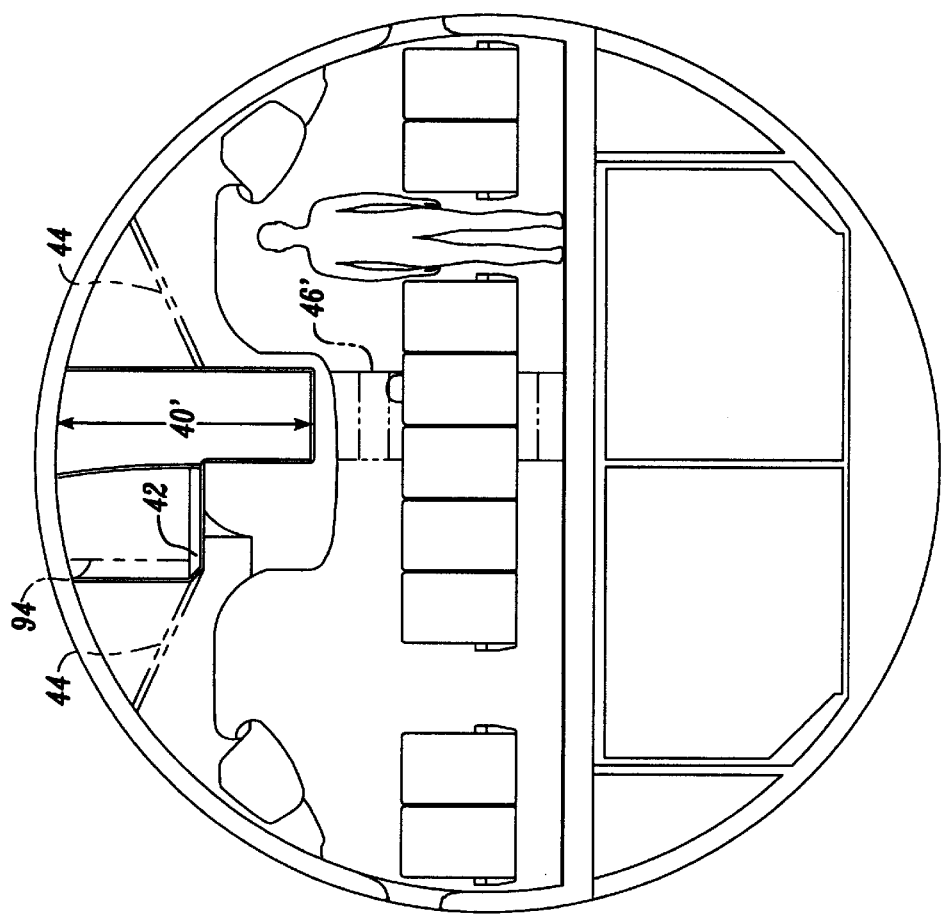
FIG. 13 is a diagrammatic transverse section of an aircraft having an overhead rest area in accordance with FIG. 12.

As noted above, a configuration which provides a center aisle is preferred, since the lowered area will be located toward the center of the aircraft where it is less obtrusive to passengers in the main cabin, and there still is the possibility of providing overhead storage bins at opposite sides of the lower portion of the aisle. Nevertheless, with reference to FIG. 12 and FIG. 13, an aisle offset toward one side of the aircraft may be provided, particularly if a smaller resting area with only a few beds is required. The overhead resting area shown in FIGS. 12 and 13 has a stairway 46' aligned with a lowered aisle 40' offset toward the port side of the aircraft, and with raised beds 42 along the starboard side of the aisle. At the leading end of the rest area, two additional side-by-side beds 80 are provided, the bed on the starboard side being accessible by a short raised cross aisle 82. As seen in FIG. 13, the lowered aisle 40', necessary to provide adequate headroom for moving through the rest area, forces the elimination of overhead bins from one side of the center unit of the main cabin, but a full-size overhead bin can be provided at the other side.

Figure 14:
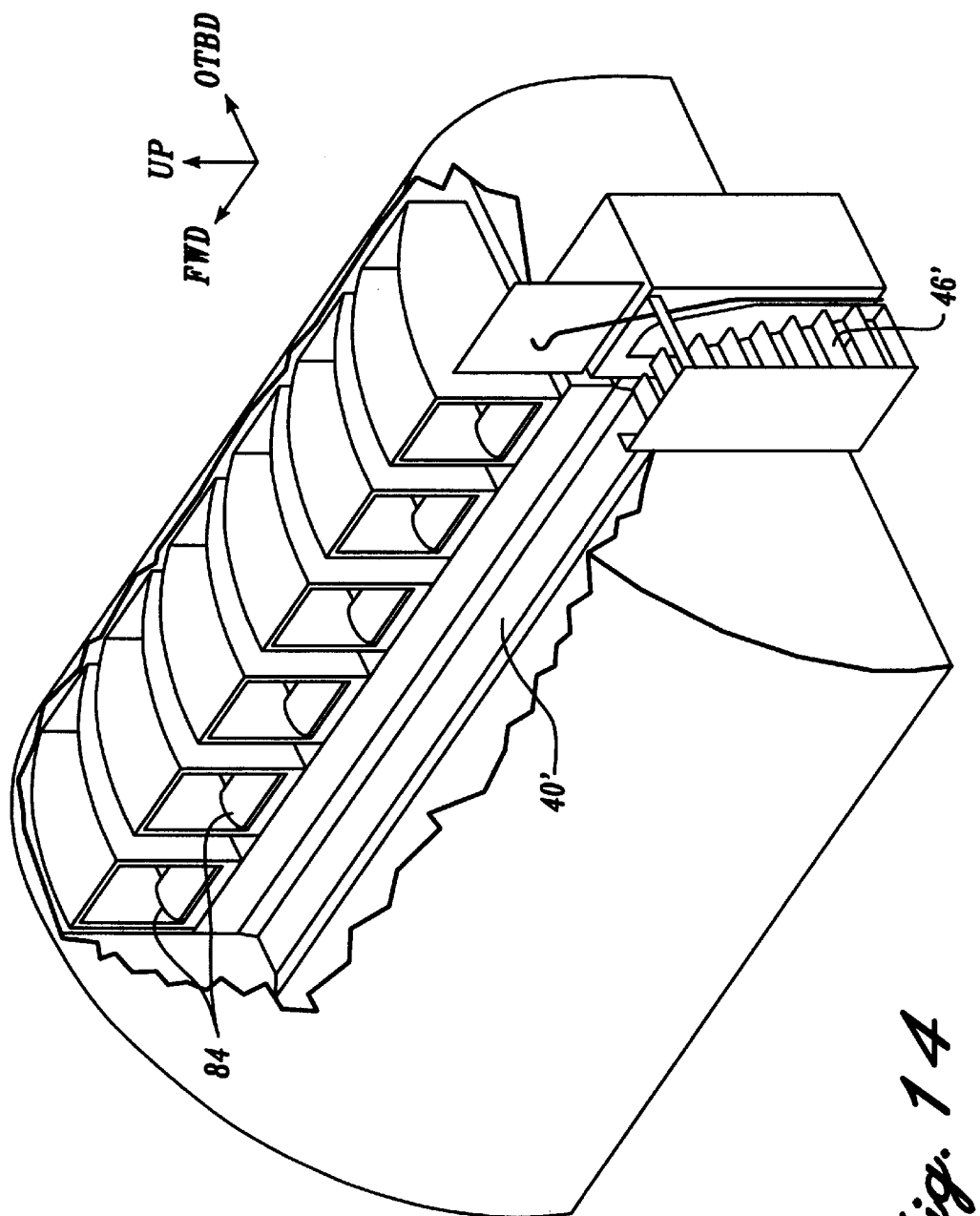
FIG. 14 is a diagrammatic top rear perspective of another alternative embodiment of an overhead rest area.

With reference to FIG. 14, another possibility is to provide transversely extending modular beds 84 having ends opening at the offset aisle 40', but this arrangement is not preferred because end access to the beds is much less convenient than side access, and the transverse extent of the beds may interfere with routing of air-conditioning ducts or other necessary components.

Figure 15:
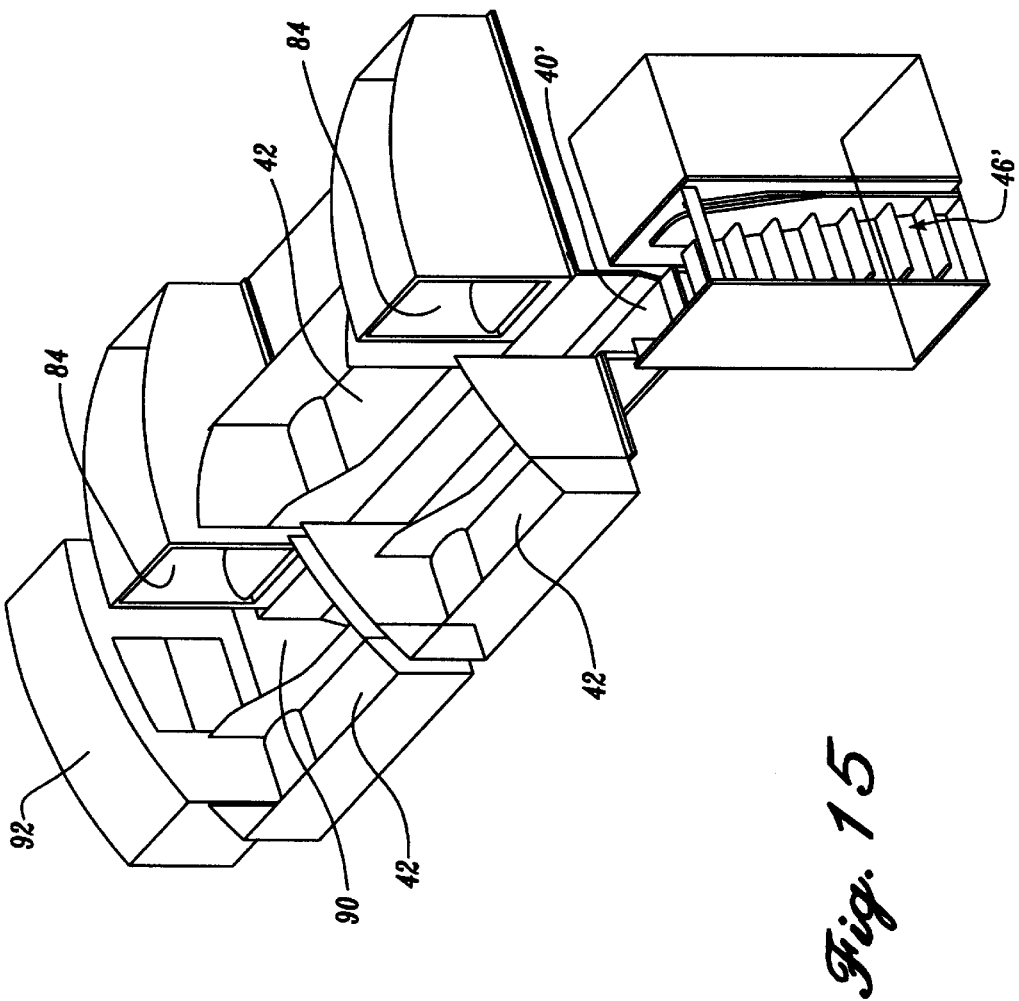
FIG. 15 is a diagrammatic top rear perspective of another alternative embodiment of an overhead rest area.
Figure 16:
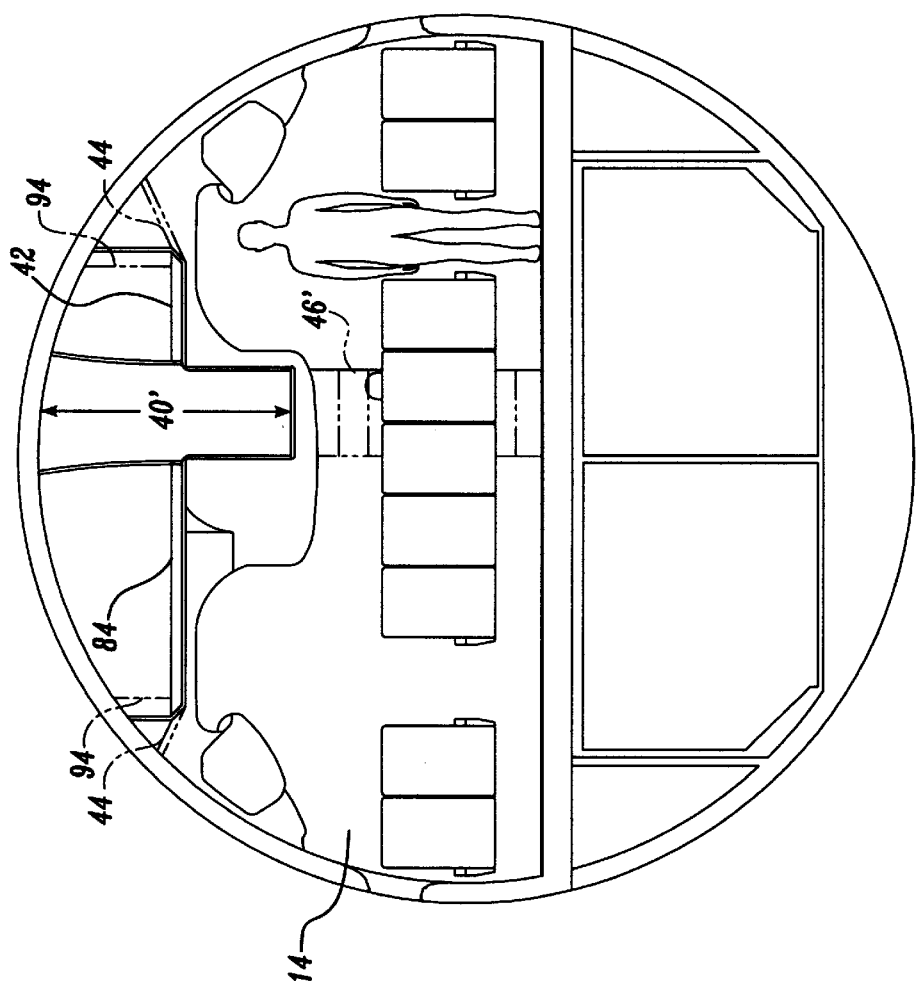
FIG. 16 is a diagrammatic vertical section through an aircraft having a rest area in accordance with FIG. 15.

Similarly, the arrangement shown in FIGS. 15 and 16 uses an aisle 40' offset toward one side of the aircraft, in this case the port side, accessible by an aft stairway 46'. The aisle 40' provides access to longitudinally extending bunks 42 at the port side, and a longitudinally extending bed 42 at the center of the starboard side, which is sandwiched between transversely extending beds 84. Beds 84 would have end access. At the forward portion of the rest area of FIGS. 15 and 16 a widened passing area 90 is provided, adjacent to a forward bed 92 which is approximately centered in the aircraft. As seen in FIG. 16, this arrangement will necessitate removing the overhead bins from one side of the center overhead storage area, and may provide too great an obstruction to longitudinally extending air conditioning ducts or other components to be practical for some aircraft. Nevertheless, as in all embodiments of the invention, seating in the main passenger cabin 14 or cargo/baggage capability in the lower lobe is minimally affected, so that the revenue generating capability of the aircraft is maximized, while still providing a convenient and comfortable rest area for attendants and pilots.

Figure 17:
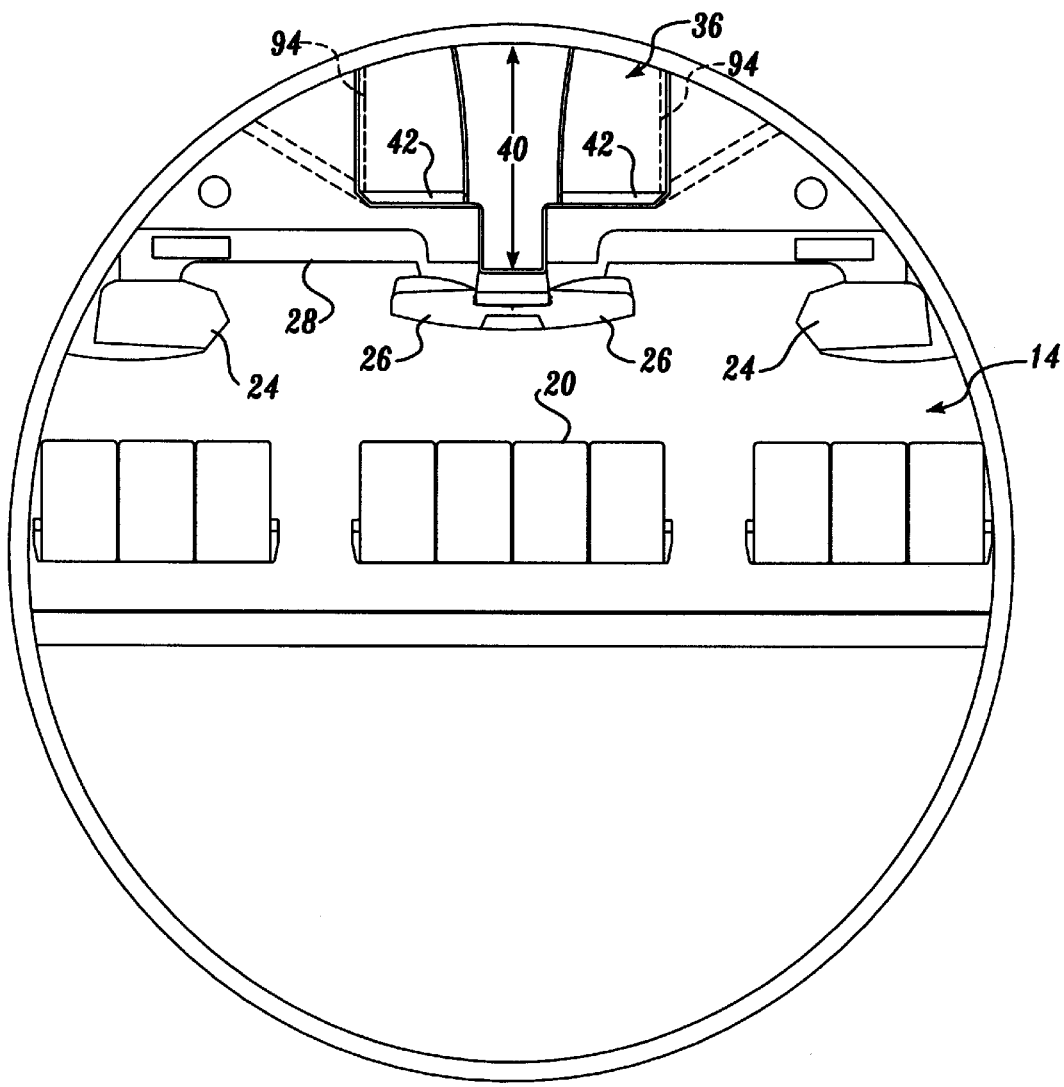
FIG. 17 is a diagrammatic vertical section through an aircraft of ovoid cross-section, such as a Boeing 747, illustrating an overhead crew rest area without lowered center stowbins.

The arrangement shown in FIG. 17 illustrates the applicability to a larger aircraft of ovoid cross-section. Overhead attendant rest space 36 has adequate headroom for the long narrow aisleway 40 in the crown so that the stowbins 26 are retained in their original positions.

Figure 18:
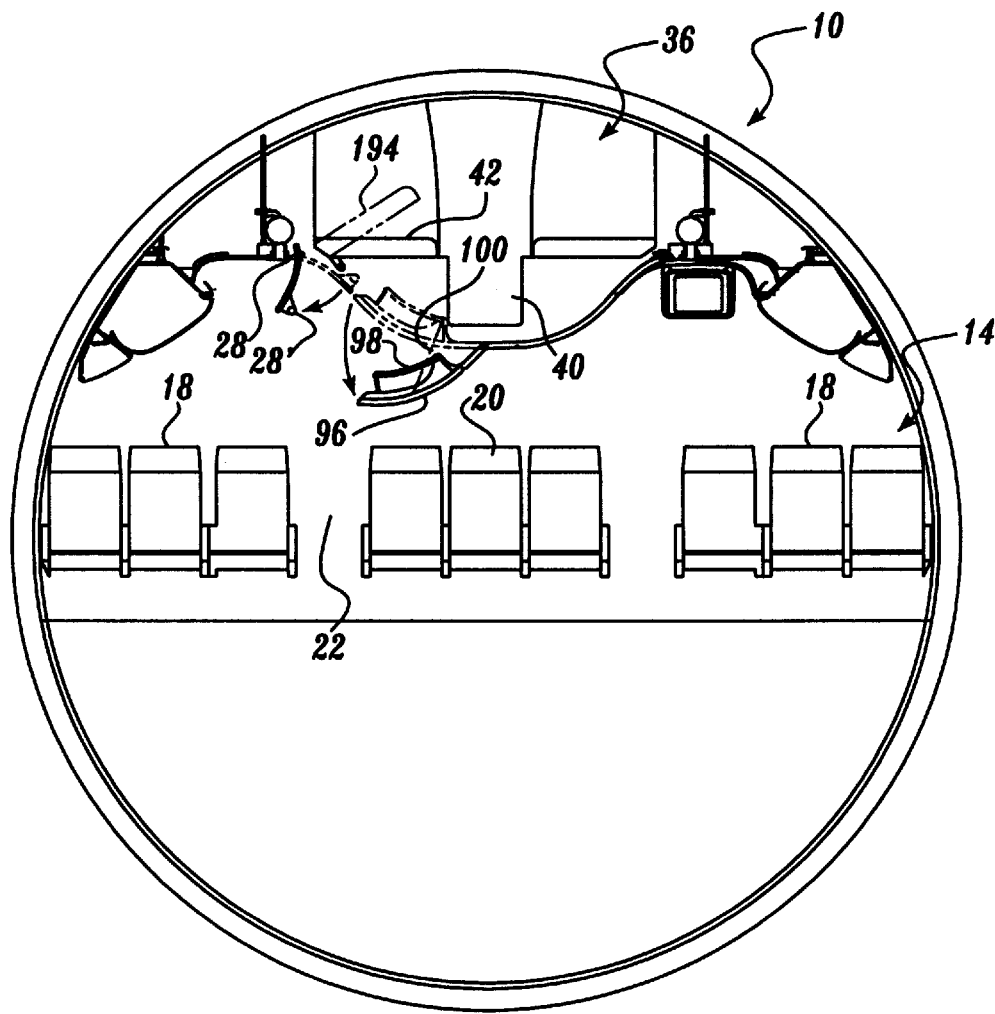
FIG. 18 is a diagrammatic transverse section of an aircraft having an escape system for an overhead rest area in accordance with the present invention.

As noted above, an additional stairway can be provided at the forward end of the rest area, but this will occupy valuable space in the main cabin. In accordance with the present invention, emergency escape apparatus can be built into the overhead rest area. For example, FIG. 18 shows an aircraft 10 with main passenger cabin 14 and overhead rest area 36. The main cabin has seating in a 3—3—3 configuration, referring to the number of seats in the outer and center seat groups 18 and 20. One of the beds 42, preferably the bed at the far end from the access stairway, has a false bottom forming an access door 194 that can be opened to reveal the underside of the bed area. In this area, the standard overhead storage bin has been removed, and an emergency exit slide 96 substituted therefor. In the case of an emergency requiring use of the exit slide 96, the user can swing open the door 194, and swing down the slide 96 which can be provided with safety handrails 98 at its opposite sides. If more room is required, the ceiling 28 can be provided with an oppositely swinging section 28' normally latched in a closed position, but releasable for increased access to the emergency slide 96. The outer end of the slide preferably is approximately aligned with one of the aisles 22 of the aircraft, and safety catches can be provided to limit the downward swinging of the slide 96. In FIG. 18, the movement limiting device is a cable 100.

Figure 19:
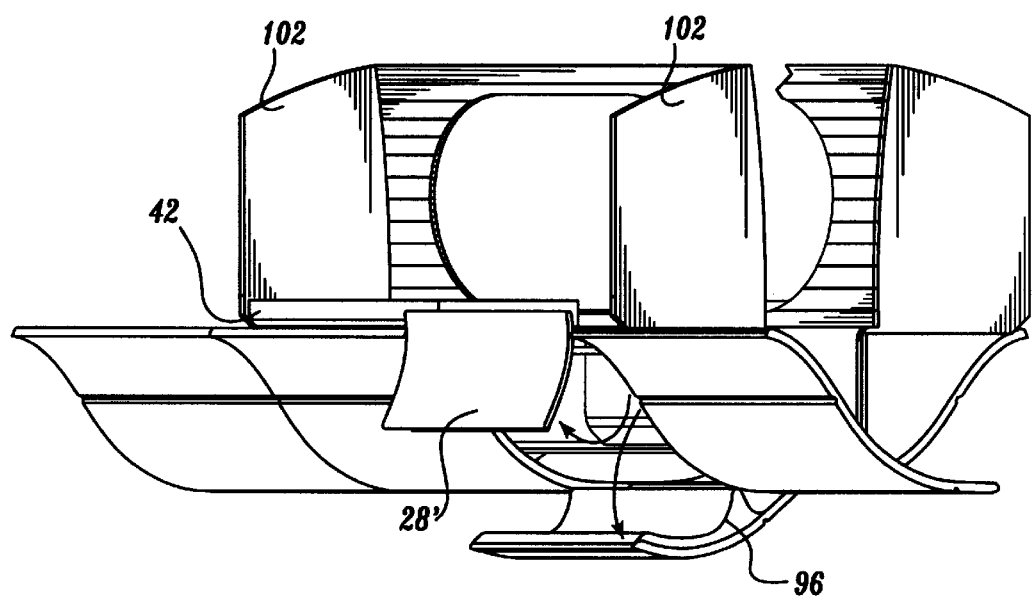
FIG. 19 is a diagrammatic perspective of an escape system in accordance with FIG. 18.

FIG. 19 shows the same configuration as FIG. 17, but with the handrailings deleted. Panels 102 are the end panels for the near bed 42 having the false bottom for access to the area of the slide 96. The swinging ceiling panel 28' also can be seen, but the outside wall for the near bunk has been deleted for clarity.

Figure 20:
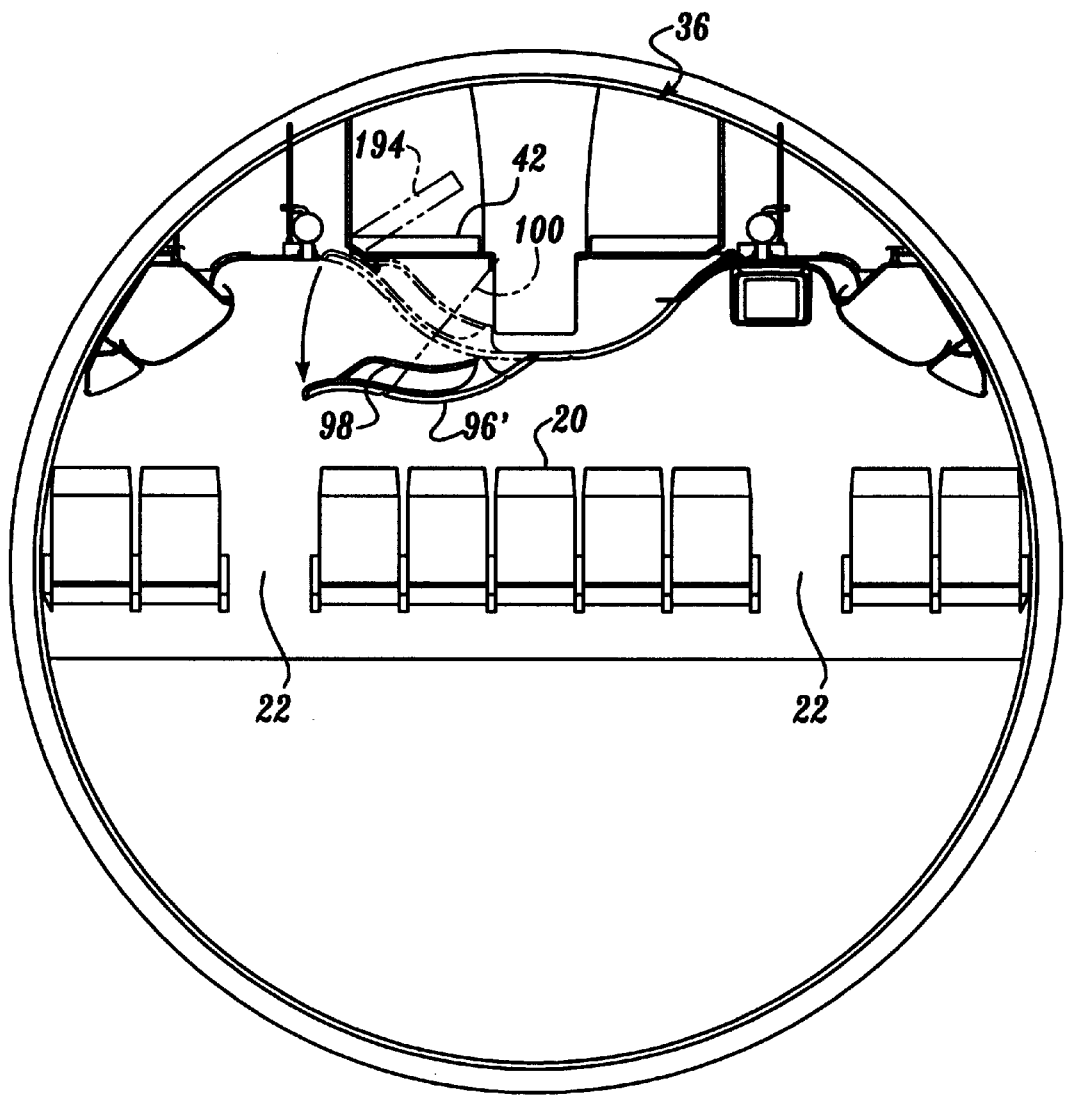
FIG. 20 is a diagrammatic vertical section through an aircraft having an alternative escape system for an overhead rest area in accordance with the present invention.

With reference to FIG. 20, in the case of a wider center seat group 20, such as a seat group having five seats rather than three, the aisles 22 will be located differently, outward of the location for the aisles shown in FIG. 18. In this case, it is preferred that the emergency exit slide 96' be longer in order for its outer end to be approximately aligned with one of the main cabin aisles. Thus, in the embodiment of FIG. 20, the slide is longer, having an underside contoured to match the adjacent ceiling of the passenger cabin, and the knockout or swinging ceiling panel section is not required. In other respects, the embodiment of FIG. 20 is identical to the embodiment of FIG. 18 and 19.

Figure 21A:
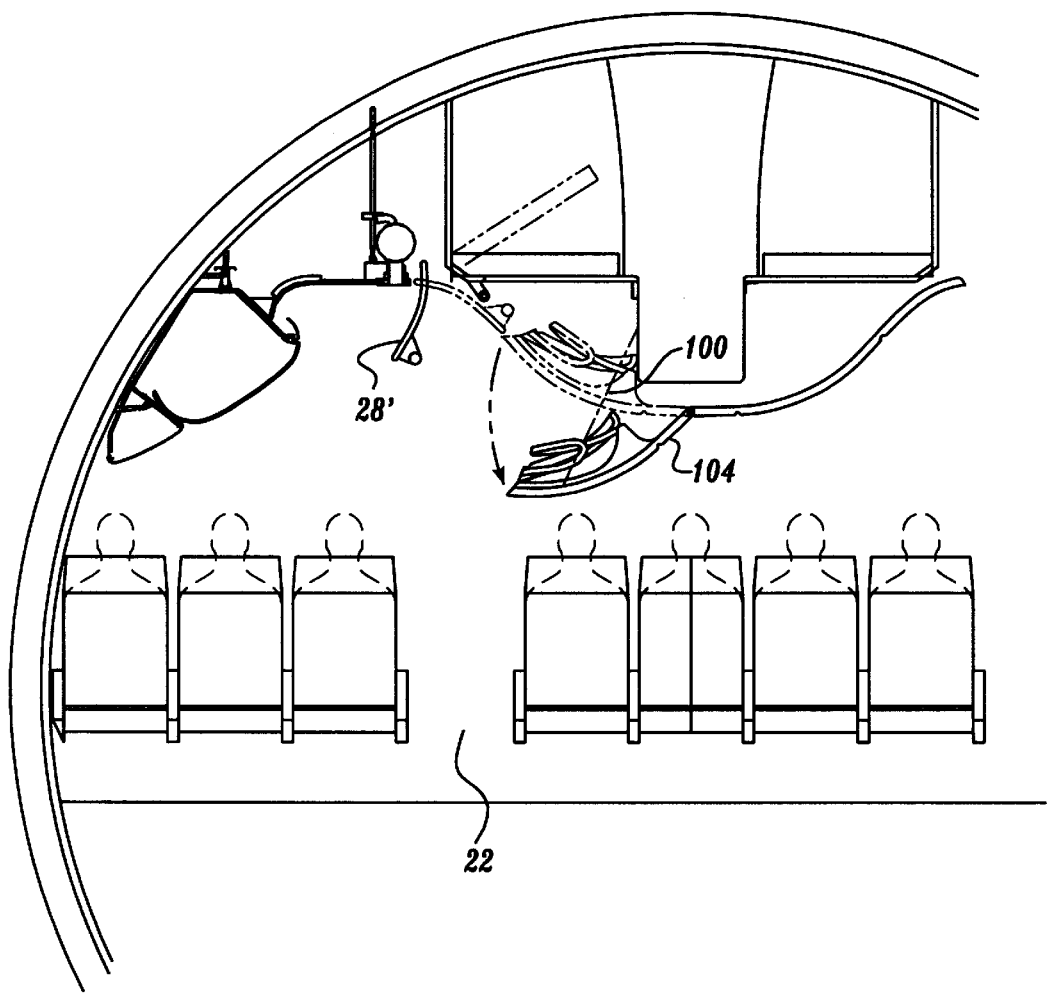
FIG. 21A is a somewhat enlarged diagrammatic transverse vertical section through an aircraft having a third embodiment of an escape system for an overhead rest area in accordance with the present invention.
Figure 21B:
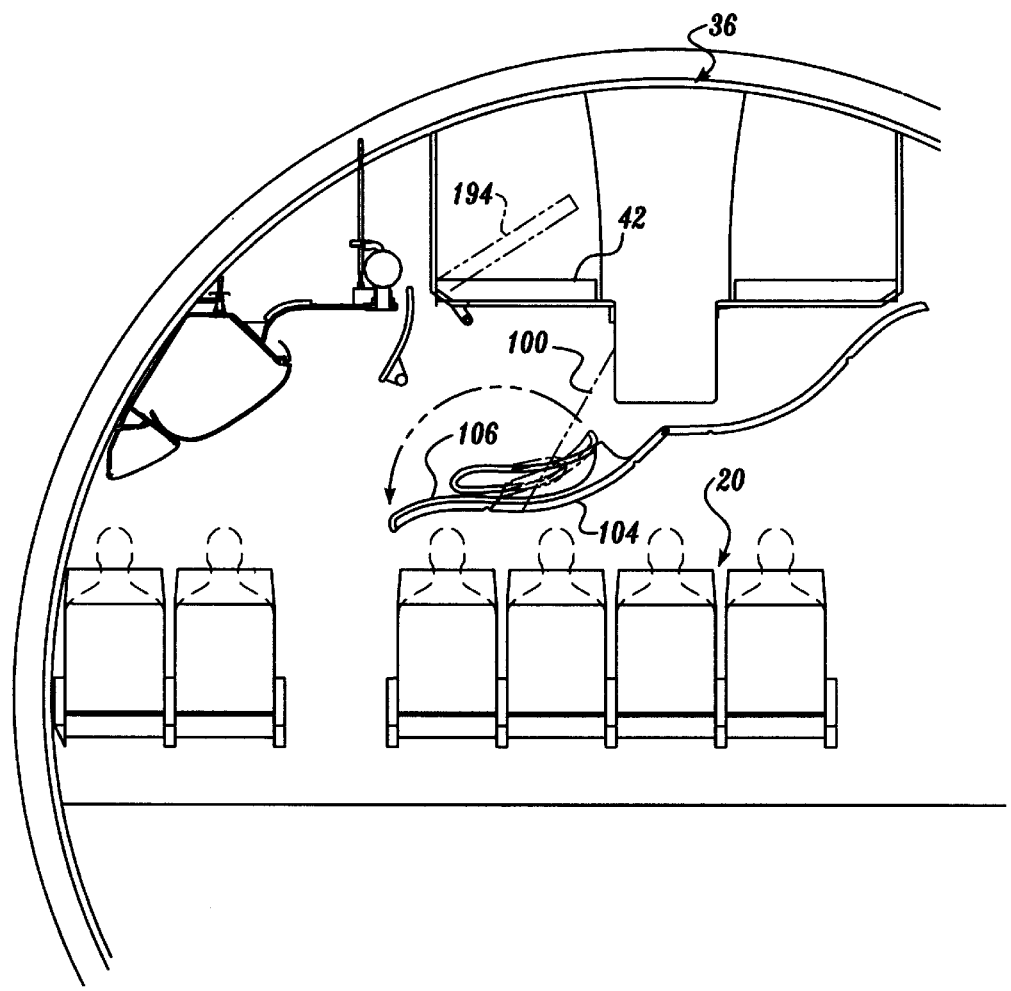
FIG. 21B is a diagrammatic vertical section corresponding to FIG. 21A but with parts in different positions.

FIGS. 21A and 21B disclose an escape slide of adjustable length, so that it can be used with different seating configurations of the main cabin. With reference to FIG. 21A, in a contracted condition the slide 104 is of a length appropriate for a 3—3—3 seating configuration in the main cabin, i.e., its inner edge will be approximately aligned with one of the aisles 22 for that type of seating configuration. The underside of slide 104 matches the contour of the adjacent ceiling structure, and a swinging or knockout ceiling panel 28' is provided outboard of the slide. In the case of a wider seat group 20, as seen in FIG. 21B, the slide 104 can be extended, in this case by unfolding an outer section 106 which is hinged to the inner section of the slide. This forms a smooth continuation of the upper surface of the inner section, having approximately the same profile as the embodiment shown in FIG. 20, for example. Access to the emergency slide is the same as for the previously described embodiments by way of a false bottom in one of the beds 42.

Figure 22:
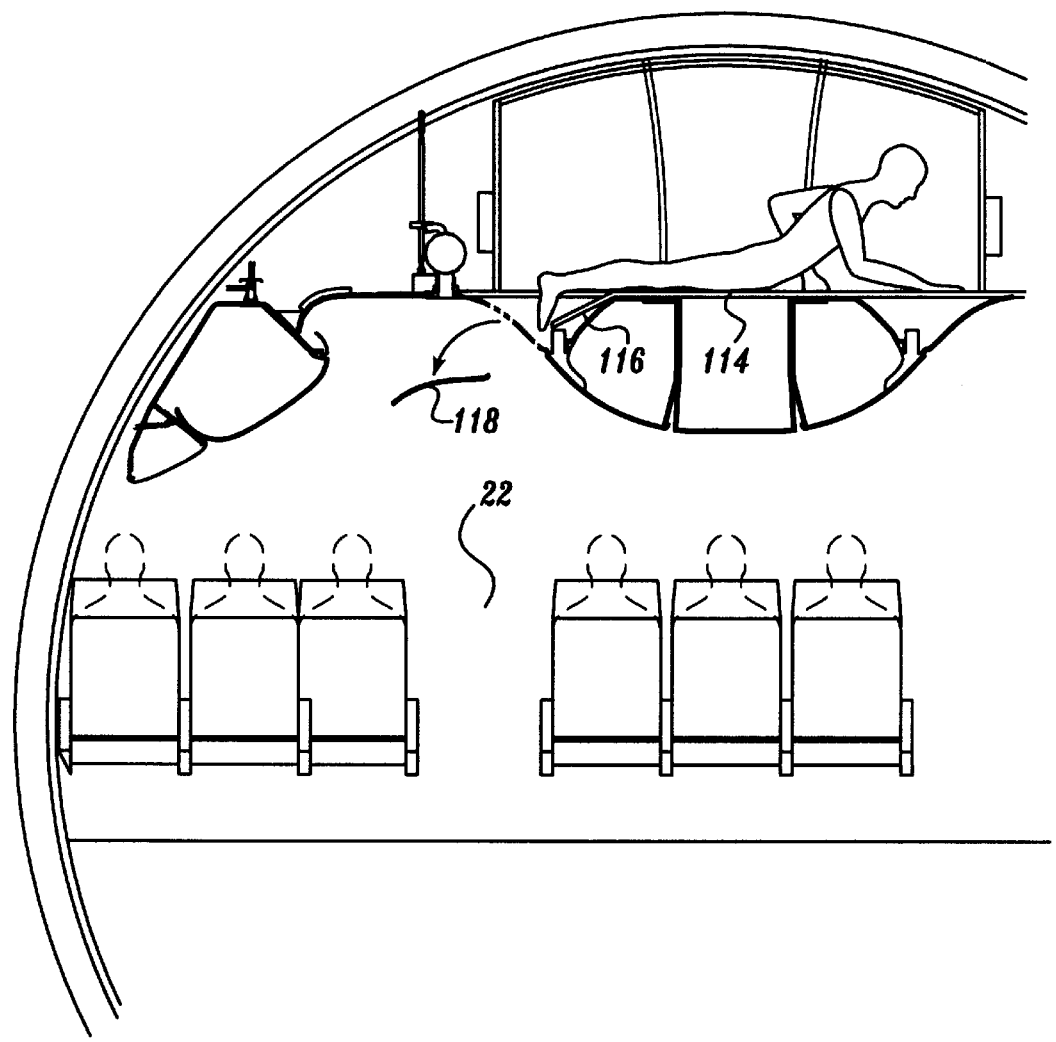
FIG. 22 is a somewhat enlarged vertical section through an aircraft illustrating a fourth embodiment of an escape system for an overhead at rest area in accordance with the present invention.
Figure 23:
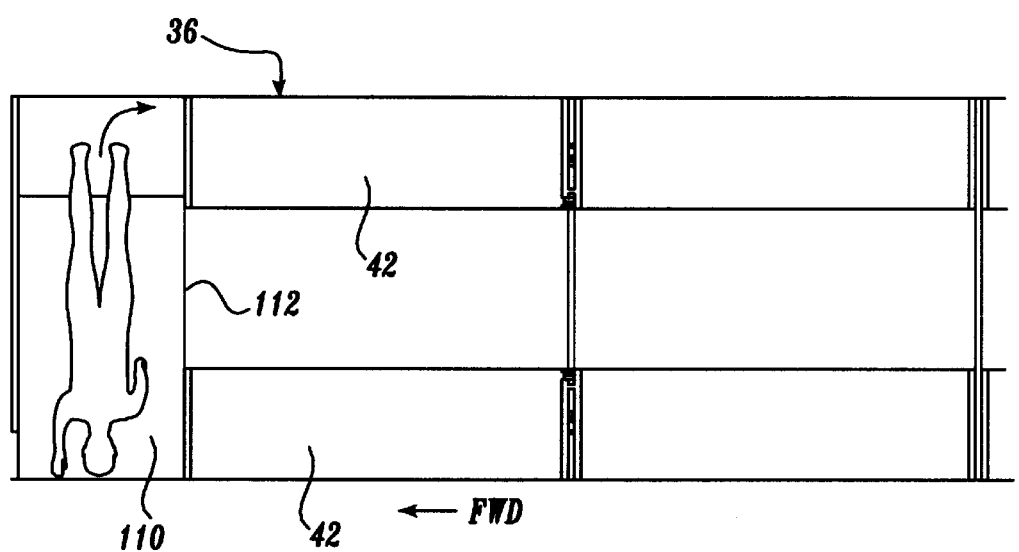
FIG. 23 is a diagrammatic top plan of an escape system in accordance with FIG. 22.

With reference to FIG. 22 and FIG. 23, another alternative is to provide a separate module solely for the purpose of emergency exiting of the overhead rest area. With reference to FIG. 23, the module preferably is provided at the opposite end of the rest area 36 from the primary access, in this case at the forward end. Escape module 110 can be segregated from the remainder of the rest area by a knockout wall 112. As seen in FIG. 22, the escape module consists primarily of a horizontal platform 114 at approximately the height of the adjacent beds 42, with a downward inclined slide portion 116 at one end. The slide portion 116 registers with a knockout ceiling panel 118, or the ceiling panel can be hinged to the remainder of the ceiling structure. For emergency exiting, the user lies down on the platform 114 as shown, and slides outboard along the slide portion 116 into an aisle 22 of the passenger cabin.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An emergency escape system in an aircraft having a main passenger cabin and an overhead rest area above the main passenger cabin in the crown of the aircraft above the ceiling for the main passenger cabin, said escape system comprising an exit slide accessible from the overhead rest area, said exit slide having an under surface forming a portion of the ceiling for the main passenger cabin and being movable between a closed position forming a continuation of the remainder of the ceiling of the main passenger cabin and a downward shifted open position providing egress from the overhead rest area to the main passenger cabin.

2. The system defined in claim 1, in which the exit slide is hinged to the ceiling structure of the main passenger cabin.

3. The system defined in claim 1, including means limiting downward movement of the slide.

4. The system defined in claim 1, in which the main passenger cabin includes a center seat group and an aisle extending along the center seat group, the slide having an exit end approximately aligned with the aisle when in the downward shifted position.

5. The system defined in claim 1, in which the ceiling for the main passenger cabin includes a section adjacent to the slide movable between a closed position and an open position providing increased access to the slide.

6. The system defined in claim 1, in which the slide is of adjustable length.

7. The system defined in claim 6, in which the slide has an outer portion hinged to an inner portion and swingable relative thereto between a retracted position forming a slide of a first length and an extended position forming a slide of an increased length.

8. The system defined in claim 1, in which the slide has handrails at opposite sides movable therewith.

9. The system defined in claim 1, in which the overhead rest area includes a bed having a false bottom providing access to the slide.

10. An emergency escape system in an aircraft having a main passenger cabin and an overhead rest area above the main passenger cabin in the crown of the aircraft above the ceiling for the main passenger cabin, said system comprising a normally closed ceiling section for the main passenger cabin, said ceiling section being openable to provide access between the main passenger cabin and the overhead rest area, the main passenger cabin having an aisle between seat groups, and the emergency escape system including a slide section having an end approximately aligned with the aisle for egress from the overhead rest area by way of the slide, through the ceiling section in open position, into the aisle.

11. An emergency escape system in an aircraft having a main passenger cabin and an overhead rest area above the main passenger cabin in the crown of the aircraft above the ceiling for the main passenger cabin, said system comprising a platform extending transversely of the aircraft in the overhead rest area, and a ceiling section for the main passenger cabin normally closed but openable for egress from the platform through the ceiling section and into the main passenger cabin, the platform including a horizontal support portion and an exit end slide portion inclined downward from the horizontal support portion in the overhead rest area toward the main passenger cabin.

12. The escape system defined in claim 11, including a permanent access to the overhead rest area at one end thereof, the emergency escape platform being located at the opposite end of the rest area from the permanent access.

* * * * *